(12) United States Patent
Kim et al.

(10) Patent No.: US 10,581,095 B2
(45) Date of Patent: Mar. 3, 2020

(54) MANIFOLD BLOCK OF FUEL CELL STACK AND METHOD OF MANUFACTURING THE SAME

(71) Applicants: HYUNDAI MOTOR COMPANY, Seoul (KR); KIA MOTORS CORPORATION, Seoul (KR)

(72) Inventors: Duck Whan Kim, Seongnam-si (KR); Jung Han Yu, Yongin-si (KR); Young Bum Kum, Seoul (KR); Kwi Seong Jeong, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 15/804,684

(22) Filed: Nov. 6, 2017

(65) Prior Publication Data

US 2018/0248207 A1 Aug. 30, 2018

(30) Foreign Application Priority Data

Feb. 28, 2017 (KR) ........................ 10-2017-0025965

(51) Int. Cl.
| | |
|---|---|
| H01M 8/04225 | (2016.01) |
| H01M 8/04089 | (2016.01) |
| H01M 8/04746 | (2016.01) |
| H01M 8/2485 | (2016.01) |
| H01M 8/2404 | (2016.01) |
| H01M 8/04082 | (2016.01) |
| H01M 8/04119 | (2016.01) |

(52) U.S. Cl.
CPC ... *H01M 8/04225* (2016.02); *H01M 8/04089* (2013.01); *H01M 8/04201* (2013.01); *H01M 8/04753* (2013.01); *H01M 8/2404* (2016.02); *H01M 8/2485* (2013.01); *H01M 8/04097* (2013.01); *H01M 8/04164* (2013.01); *Y02P 70/56* (2015.11)

(58) Field of Classification Search
None
See application file for complete search history.

(56) References Cited

FOREIGN PATENT DOCUMENTS

| KR | 10-2015-0077686 A | 7/2015 |
| KR | 20150077686 A * | 7/2015 |

\* cited by examiner

*Primary Examiner* — Daniel S Gatewood
(74) *Attorney, Agent, or Firm* — Morgan, Lewis & Bockius LLP

(57) ABSTRACT

A manifold block mounted to a fuel cell stack for supplying and distributing air and hydrogen to the stack, the manifold block comprises: a main body including a hydrogen inlet, a hydrogen outlet, an air inlet and an air outlet; a hydrogen outlet cover welded to an outer surface of the main body and including a condensation chamber connected to the hydrogen outlet; an air inlet cover welded to an inner surface of the main body and including an air inflow portion connected to the air inlet; and an air outlet cover welded to the inner surface of the main body and including an air outflow portion connected to the air outlet.

18 Claims, 5 Drawing Sheets

-Prior Art-

-Prior Art-

MANIFOLD BLOCK OF FUEL CELL STACK AND METHOD OF MANUFACTURING THE SAME

CROSS-REFERENCE TO RELATED APPLICATION

This application claims under 35 U.S.C. § 119(a) the benefit of priority to Korean Patent Application No. 10-2017-0025965 filed on Feb. 28, 2017, the entire content of which is incorporated herein by reference.

TECHNICAL FIELD

The present disclosure relates to a manifold block of a fuel cell stack and a method of manufacturing the same, and more particularly, to a manifold block of a fuel cell stack and a method of manufacturing the same, in which the low temperature startability of a fuel cell stack is improved and a reduction in manufacturing costs and weight is achieved.

BACKGROUND

In general, a manifold block of a fuel cell stack is a common distributor, which mounted to a portion of the stack, has passages therein for supply or discharge of hydrogen and air for generating electricity in the stack. Such a manifold block is equipped with a hydrogen supply system, which includes a hydrogen cutoff valve, a hydrogen supply valve, a hydrogen purge valve, a water trap and drain valve, and a hydrogen ejector, for optimizing the performance and the packaged structure of the fuel cell system. Hydrogen passages, through which hydrogen flows, are formed in the hydrogen supply system and the manifold block.

The manifold block has a highly complicated structure in order to provide passages for ensuring the smooth movement of hydrogen in the limited space in the manifold block. Currently, the manifold block is manufactured using an aluminum gravity casting method.

However, because aluminum ions are eluted from the aluminum and the eluted aluminum ions deteriorate the performance of a membrane-electrode assembly, which is a main component of the stack, a surface-coating process must be performed on the passages in the manifold block in order to prevent the elution of aluminum ions.

Further, the surface-coating is time-consuming because the passages in the manifold block are complicated, post-processing must be performed after the casting of the manifold block, and it takes a lot of time to process the manifold block because various components mate with corresponding portions of the manifold block.

Furthermore, the manifold block made of an aluminum material lowers the temperature of the air introduced into the stack during the cold-start operation of the stack, thus having a bad influence on the cold-start operation.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the conventional art where a manifold block is generally made of an aluminum material. The present disclosure, therefore, provides a manifold block of a fuel cell stack and a method of manufacturing the same. The manifold block includes several parts to be manufactured of a plastic material using an injection-molding method and the parts are modularized into a unitary body by means of a welding method such as laser welding, thereby eliminating an additional part for preventing the elution of aluminum ions. The manifold block, accordingly, improves the low temperature startability of the fuel cell stack.

According to one aspect of the present disclosure, a manifold block mounted to a fuel cell stack for supplying and distributing air and hydrogen required for operation of the stack to the stack includes: a main body including a hydrogen inlet and a hydrogen outlet, which are connected to hydrogen passages formed in the stack, and an air inlet and an air outlet, which are connected to air passages formed in the stack; a hydrogen outlet cover attached to an outer surface of the main body and including a condensation chamber connected to the hydrogen outlet; an air inlet cover attached to an inner surface of the main body and including an air inflow portion connected to the air inlet; and an air outlet cover attached to the inner surface of the main body and including an air outflow portion connected to the air outlet.

The main body may include an air inflow passage sealed by the air inlet cover and an air outflow passage sealed by the air outlet cover, and the manifold block may further include an air cutoff valve (ACV) cover welded to the outer surface of the main body, the ACV cover having a hole structure so as to be connected to an inlet of the air inflow passage and an outlet of the air outflow passage.

The main body, the hydrogen outlet cover, the air inlet cover, the air outlet cover and the ACV cover may be formed of a plastic material. The air inlet cover and the air outlet cover may be welded to the inner surface of the main body by means of laser welding, and the ACV cover and the hydrogen outlet cover may be welded to the outer surface of the main body by means of laser welding.

The air inlet cover and the air outlet cover welded to the inner surface of the main body may be provided along outer edge portions thereof with flange portions, each including a welding groove or a welding protrusion for laser welding, and the inner surface of the main body may be provided with a remaining one of the welding groove and the welding protrusion for the laser welding.

The hydrogen outlet cover welded to the outer surface of the main body may be provided along an outer edge portion thereof with a flange portion including a welding groove or a welding protrusion for laser welding, and the outer surface of the main body may be provided with a remaining one of the welding groove and the welding protrusion for the laser welding.

The manifold block may further include an air inlet guide block assembled with a region of the inner surface of the main body, the air inlet guide block surrounding the air inflow portion in the air inlet cover and the hydrogen outlet in the main body and serving as one of the walls of a gasket groove formed in an upper end of the air inflow portion and as one of the walls of a gasket groove formed in an upper end of the hydrogen outlet, and an air outlet guide block assembled with another region of the inner surface of the main body, the air outlet guide block surrounding the air outflow portion in the air outlet cover and the hydrogen inlet in the main body and serving as one of the walls of a gasket groove formed in an upper end of the air outflow portion and as one of the walls of a gasket groove formed in an upper end of the hydrogen inlet.

The manifold block may further include a hydrogen interface for supply of hydrogen, the hydrogen interface being assembled with the outer surface of the main body so as to be connected to the hydrogen inlet in the main body, and an ejector diffuser assembled between the hydrogen outlet cover and the hydrogen interface, one side wall of the hydrogen outlet cover, to which one end portion of the ejector diffuser is coupled, being formed to be perpendicular to a longitudinal direction of the ejector diffuser.

According to another aspect of the present disclosure, a method of manufacturing a manifold block that is mounted to a fuel cell stack in order to supply and distribute air and hydrogen to the stack, the method including a first step of forming a main body including a hydrogen inlet, a hydrogen outlet, an air inlet and an air outlet, a second step of forming a hydrogen outlet cover including a condensation chamber connected to the hydrogen outlet, a third step of forming an air inlet cover including an air inflow portion connected to the air inlet, a fourth step of forming an air outlet cover including an air outflow portion connected to the air outlet, and a fifth step of welding the hydrogen outlet cover to an outer surface of the main body and welding the air inlet cover and the air outlet cover to an inner surface of the main body.

In the first step, the main body may be formed to include an air inflow passage sealed by the air inlet cover and an air outflow passage sealed by the air outlet cover, and the method may further include a step of forming an ACV cover having a hole structure so as to be connected to an inlet of the air inflow passage and an outlet of the air outflow passage and welding the ACV cover to the outer surface of the main body.

The air inlet cover, the air outlet cover, the hydrogen outlet cover and the ACV cover may be welded to the main body by means of laser welding. To this end, in the second step, a flange portion, including a welding groove or a welding protrusion for laser welding, may be formed along an outer edge portion of the hydrogen outlet cover, and, in the first step, a remaining one of the welding groove and the welding protrusion for the laser welding may be formed on the outer surface of the main body.

In the third step, a flange portion, including a welding groove or a welding protrusion for laser welding, may be formed along an outer edge portion of the air inlet cover, and, in the first step, a remaining one of the welding groove and the welding protrusion for the laser welding may be formed on the inner surface of the main body.

In the fourth step, a flange portion, including a welding groove or a welding protrusion for laser welding, may be formed along an outer edge portion of the air outlet cover, and, in the first step, a remaining one of the welding groove and the welding protrusion for the laser welding may be formed on the inner surface of the main body.

The method may further include, after the fifth step, a step of assembling an air inlet guide block with a region of the inner surface of the main body, the air inlet guide block surrounding the air inflow portion and the hydrogen outlet and serving as one of the walls of a gasket groove formed in an upper end of the air inflow portion and as one of the walls of a gasket groove formed in an upper end of the hydrogen outlet, and a step of assembling an air outlet guide block with another region of the inner surface of the main body, the air outlet guide block surrounding the air outflow portion and the hydrogen inlet and serving as one of the walls of a gasket groove formed in an upper end of the air outflow portion and as one of the walls of a gasket groove formed in an upper end of the hydrogen inlet.

The method may further include a step of assembling a hydrogen interface for supply of hydrogen with the outer surface of the main body so as to be connected to the hydrogen inlet in the main body.

In the second step, an ejector diffuser may be assembled between the hydrogen outlet cover and the hydrogen interface, and the hydrogen outlet cover may be formed such that one side wall of the hydrogen outlet cover, to which one end portion of the ejector diffuser is coupled, may be perpendicular to a longitudinal direction of the ejector diffuser.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
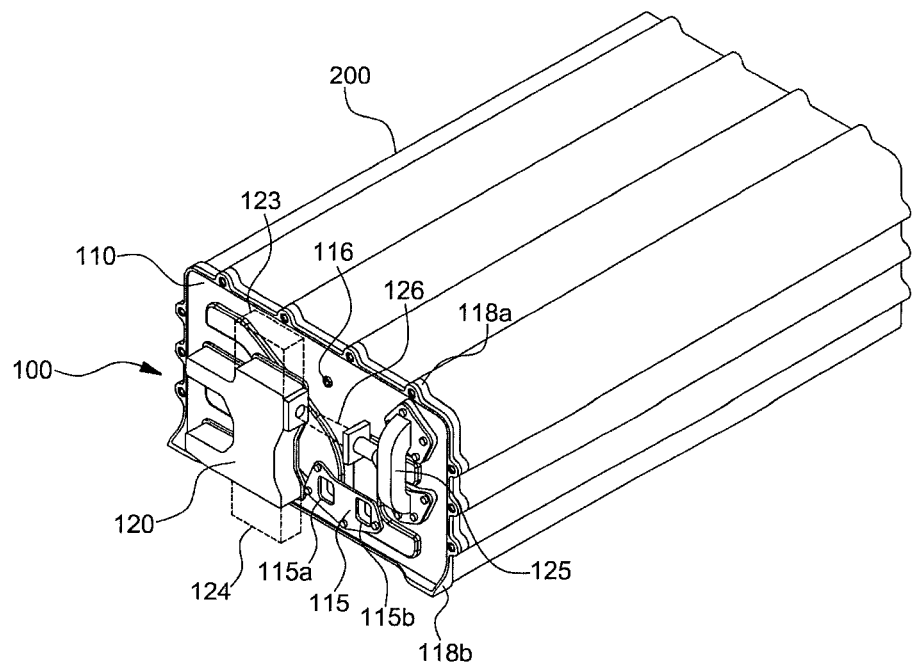
FIG. 1 is a view illustrating the outer portion of a manifold block of a fuel cell stack according to an embodiment of the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
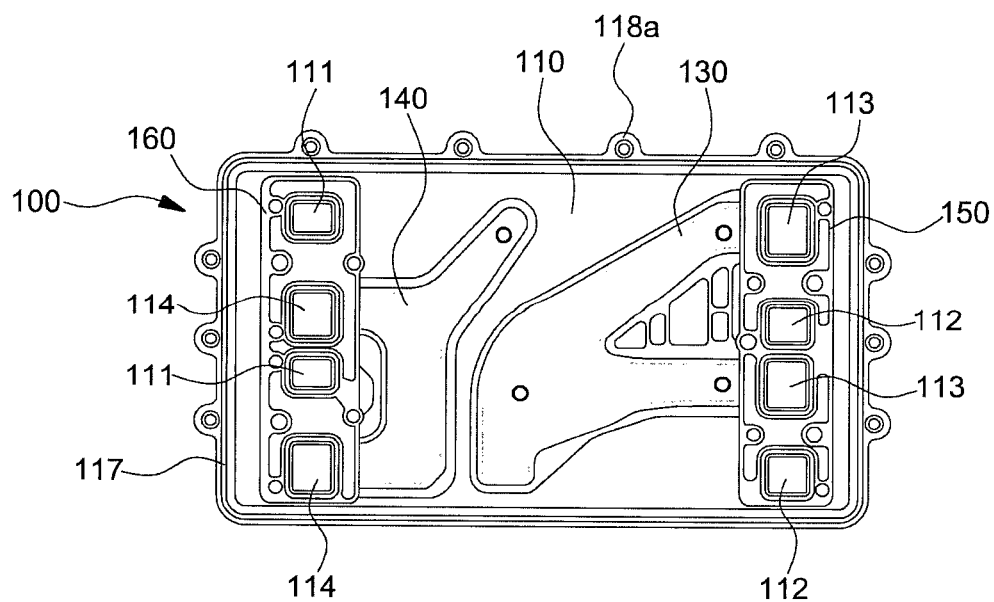
FIG. 2 is a view illustrating the inner portion of the manifold block of a fuel cell stack according to an embodiment of the present disclosure.

As shown in FIGS. 1 and 2, a manifold block 100 according to an embodiment of the present disclosure is a common distributor of a fuel cell stack 200, which is mounted to a portion of the fuel cell stack 200 for supplying air and hydrogen to the stack 200 and discharging or re-circulating air and hydrogen from or to the stack 200.

As is well known, the fuel cell stack has therein hydrogen passages for the flow of the supplied hydrogen and air passages for the flow of the supplied air. The fuel cell stack typically refers to one stack module or a modularized assembly in which two or more stack modules are stacked vertically.

The manifold block 100 according to an embodiment of the present disclosure is embodied as a common distributor of the stack 200 that is modularized in a two-stage structure.

The manifold block 100 has hydrogen inlets 111 and hydrogen outlets 112 therein, which are connected to the hydrogen passages in the stack 200, and air inlets 113 and air outlets 114, which are connected to the air passages in the stack 200. The hydrogen inlets 111 and the air inlets 113 function to distribute hydrogen and air to the upper and lower portions of the stack, which is modularized in a two-stage structure, and to collect hydrogen and air flowing out of the hydrogen outlets 112 and the air outlets 114 and to discharge them to the outside or recirculate them to the stack 200.

Further, to improve the durability of the stack 200, an air cutoff valve (not shown) is directly connected to an air interface (an air cutoff valve (ACV) cover) 115 of the manifold block 100, which is provided for the introduction and discharge of air into and from the stack 200. In addition, the manifold block 100 is integrally provided with a condensation chamber 121 (refer to FIG. 5) for removing condensed water from the recirculated hydrogen.

A hydrogen supply device (or a fuel processing system (FPS) assembly) 123 is mounted to an upper end portion of the condensation chamber 121. A water trap 124 is mounted to a lower end portion of the condensation chamber 121 in order to collect condensed water flowing out of the condensation chamber 121 and to discharge the same to the outside. An ejector diffuser 126, to which a hydrogen interface 125 is connected, is mounted to a side portion of the condensation chamber 121.

Although not illustrated in detail in the drawings, the hydrogen supply device 123 includes a hydrogen cutoff valve, a hydrogen supply valve and a hydrogen purge valve. The hydrogen purge valve is connected to a purge hole 116 in a main body 110 of the manifold block 100 to purge hydrogen to an air outflow passage 143.

As described above, as a result of the manifold block 100 being modularized with the hydrogen supply device 123, the water trap 124 and the ejector diffuser 126, the manifold block 100 has therein a passage connected to the hydrogen passages in the stack 200 and is integrally provided with the hydrogen supply system.

Accordingly, the above-described modularized manifold block 100 of the stack has a highly complicated structure.

In accordance with the present disclosure, the manifold block 100 can be manufactured of a plastic material using an injection-molding method. To this end, as shown in FIGS. 1 to 5, the manifold block 100 is sectioned into a main body 110, a hydrogen outlet cover 120, an air inlet cover 130, an air outlet cover 140, an air cutoff valve (ACV) cover 115, a hydrogen interface 125, an air inlet guide block 150 and an air outlet guide block 160, and these constituent components are modularized into a unitary body by means of a welding method such as laser welding.

In order to prevent the hardness of the manifold block 100 made of a plastic material from being degraded below that of a manifold block made of an aluminum material and to ensure a hardness level equivalent to that of an aluminum material, a high-strength plastic material, for example, engineering plastic, is used for the manifold block 100.

The main body 110 is a main component of the manifold block 100, which functions as a watertight partition wall for sealing the interior of the fuel cell stack 200 in a watertight manner. The main body 110 is integrally provided with bolt flanges 118a and mounting brackets 118b, which are used to couple the manifold block 100 to the fuel cell stack 200. The main body 110 has therein hydrogen inlets 111 and hydrogen outlets 112, which are connected to the hydrogen passages formed in the stack 200, and air inlets 113 and air outlets 114, which are connected to the air passages formed in the stack 200.

The main body 110 is provided along the marginal portion thereof with a watertight gasket 117 in order to enhance the watertight performance of the main body 110. The watertight gasket 117 functions to ensure the watertightness of the stack complete (an assembly of the stack and the manifold block) in cooperation with an enclosure, which corresponds to a stack cover.

When the main body 110 is coupled to the stack 200, one surface (an outer surface) of the main body 110 is oriented toward the exterior of the stack 200 and the opposite surface (an inner surface) of the main body 110 faces the stack 200.

A hydrogen outlet cover 120, which forms the condensation chamber 121 connected to the hydrogen outlets 112 in the main body 110, and an air cutoff valve (ACV) cover 115 are securely welded to the outer surface of the main body 110, specifically, are modularized therewith, by means of laser welding.

An air inlet cover 130, which has therein an air inflow portion 131 connected to the air inlets 113 in the main body 110, and an air outlet cover 140, which has therein an air outflow portion 141 connected to the air outlets 114 in the main body 110, are securely welded to the inner surface of the main body 110, specifically, are modularized therewith, by means of laser welding. The air inflow portion 131 is connected to the air passages in the stack 200 via the air inlets 113, and the air outflow portion 141 is connected to the air passages in the stack 200 via the air outlets 114.

Since the hydrogen outlet cover 120, the ACV cover 115, the air inlet cover 130 and the air outlet cover 140 are modularized with the main body 110 by laser welding, separate fastening members for assembly and gasket members for air-tightness between the components may be unnecessary.

The hydrogen outlet cover 120 is welded to the outer surface of the main body 110 in a sealed manner such that the condensation chamber 121 communicates with the hydrogen outlets 112. Hydrogen discharged to the condensation chamber 121 through the hydrogen outlets 112 moves to the air outflow passage 143 via the purge valve of the hydrogen supply device 123 and the purge hole 116 formed in the main body 110, and is then discharged to the outside of the manifold block 100 via the outlet of the air outflow passage 143.

When the air inlet cover 130 is welded to the inner surface of the main body 110, the air inlet cover 130 seals an air inflow passage 133, which is concavely formed in the inner surface of the main body 110, and the air inflow passage 133 communicates with the air passages in the stack 200 via the air inlets 113 in the main body 110.

When the air outlet cover 140 is welded to the inner surface of the main body 110, the air outlet cover 140 seals the air outflow passage 143, which is concavely formed in the inner surface of the main body 110, and the air outflow passage 143 communicates with the air passages in the stack 200 via the air outlets 114 in the main body 110.

At this time, the outlets of the air inflow passage 133 (which are located downstream of the air inflow passage in the air flow direction) serve as the air inlets 113 in the main body 110 and communicate with the air inflow portion 131 in the air inlet cover 130. The inlet of the air inflow passage 133 (which is located upstream of the air inflow passage in the air flow direction) is connected to an air supply system via the air cutoff valve (not shown) in order to receive external air.

The inlets of the air outflow passage 143 serve as the air outlets 114 in the main body 110 and communicate with the air outflow portion 141 in the air outlet cover 140. The outlet of the air outflow passage 143 functions to discharge air, flowing into the air outflow passage 143, to the outside via the air cutoff valve (not shown).

The air cutoff valve (not shown) for controlling the inflow of air to the air inflow passage 133 and the outflow of air from the air outflow passage 143 is mounted to the ACV cover 115. The ACV cover 115 has a hole structure (115a and 115b) so as to be connected to the inlet of the air inflow passage 133 and the outlet of the air outflow passage 143.

Figure 6:
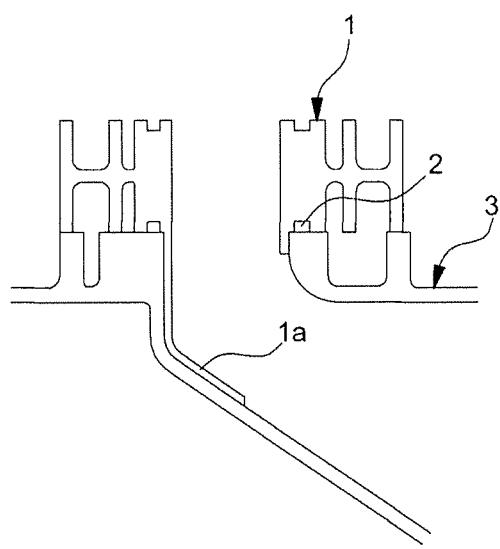
FIG. 6 is a view illustrating a sectional structure of a hydrogen outlet region in a conventional manifold block.

On the other hand, as shown in FIG. 6, a conventional manifold block made of an aluminum material includes a hydrogen outlet insulation cover 1 for preventing degradation of insulation resistance caused by condensed water flowing out of the stack. A gasket groove 2, in which an airtight gasket is fitted, is formed in the insulation cover 1 in order to ensure air-tightness between a main body 3 and the insulation cover 1. Further, a portion of the insulation cover 1 extends toward a hydrogen outlet in the main body 3 so as to form an extended cover portion 1a for preventing condensed water from touching the main body 3, which is made of an aluminum material.

However, since the manifold block 100 is made of a plastic material, the elution of aluminum ions does not occur. Therefore, a separate component for preventing degradation of insulation resistance is unnecessary. That is, it is possible to eliminate the extended cover portion 1a in the prior art. In addition, since the components are modularized into a unitary body by means of laser welding, it is possible to eliminate the airtight gasket fitted in the gasket groove 2 in the prior art.

Instead, airtight gaskets are provided at the parts that are directly connected to the ends of the air passages in the fuel cell stack 200, that is, at the air inflow portion 131 in the air inlet cover 130 and the air outflow portion 141 in the air outlet cover 140, in order to ensure air-tightness between the stack 200 and the parts that are directly connected to the stack 200.

In accordance with the present disclosure, in order to form laser welding lines (for example, flange portions) for welding of mating components in the limited space in the main body 110 and to reduce deformation caused by contraction of components in the injection-molding process, the air inlet guide block 150 and the air outlet guide block 160 are formed as separate components and are respectively disposed at the exterior of the air inflow portion 131 in the air inlet cover 130 and at the exterior of the air outflow portion 141 in the air outlet cover 140. As a result, a portion of the air inlet guide block 150 serves as one of the walls for defining a gasket groove 132 formed in the upper end of the air inflow portion 131, and a portion of the air outlet guide block 160 serves as one of the walls for defining a gasket groove 142 formed in the upper end of the air outflow portion 141.

Figure 3A:
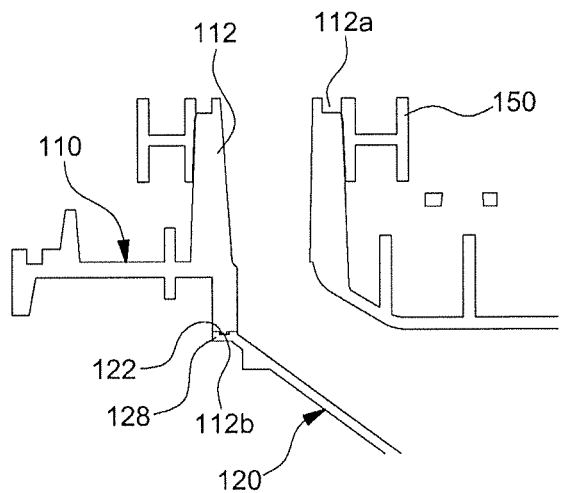
FIG. 3A is a view illustrating a sectional structure of a hydrogen outlet region in a main body according to an embodiment of the present disclosure.
Figure 4A:
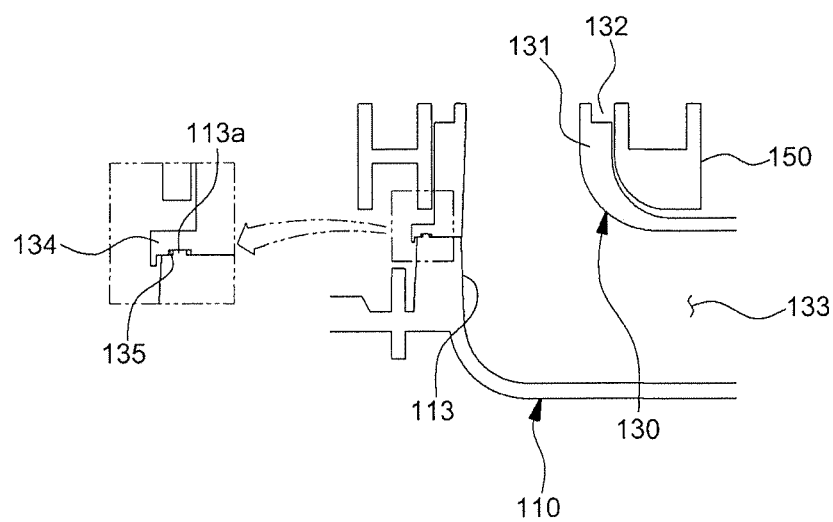
FIG. 4A is a view illustrating a sectional structure of an air inlet region in the main body according to an embodiment of the present disclosure.

As shown in FIGS. 3A and 4A, the air inlet guide block 150 is assembled with the inner surface of the main body 110 so as to surround the air inflow portion 131 in the air inlet cover 130 and the hydrogen outlets 112 in the main body 110, which are directly connected to the air passages and the hydrogen passages in the stack 200. At this time, a portion of the air inlet guide block 150 serves as one of the walls for defining a gasket groove 132 formed in the upper end of the air inflow portion 131, and another portion of the air inlet guide block 150 serves as one of the walls for defining a gasket groove 112a formed in the upper end of each of the hydrogen outlets 112 (specifically, the upper end of each of the hydrogen outlets 112 formed in the main body 110).

Accordingly, the air inlet guide block 150 may support one side of each of the airtight gaskets (not shown) fitted in a corresponding one of the gasket grooves 112a and 132.

Figure 3B:
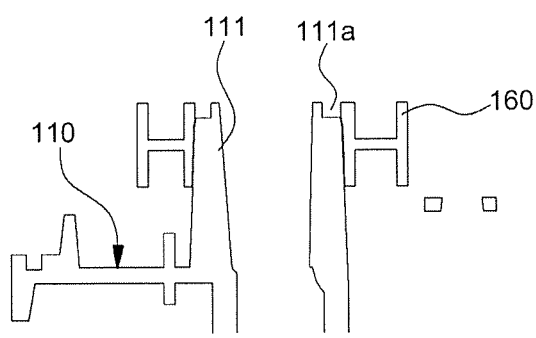
FIG. 3B is a view illustrating a sectional structure of a hydrogen inlet region in the main body according to an embodiment of the present disclosure.
Figure 4B:
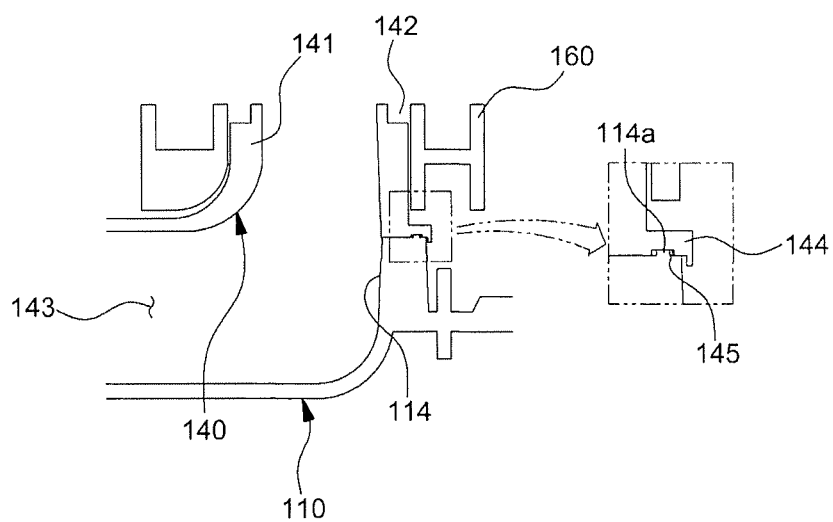
FIG. 4B is a view illustrating a sectional structure of an air outlet region in the main body according to an embodiment of the present disclosure.

As shown in FIGS. 3B and 4B, the air outlet guide block 160 is assembled with the inner surface of the main body 110 so as to surround the air outflow portion 141 in the air outlet cover 140 and the hydrogen inlets 111 in the main body 110, which are directly connected to the air passages and the hydrogen passages in the stack 200. At this time, a portion of the air outlet guide block 160 serves as one of the walls for defining a gasket groove 142 formed in the upper end of the air outflow portion 141, and another portion of the air outlet guide block 160 serves as one of the walls for defining a gasket groove 111a formed in the upper end of each of the hydrogen inlets 111 (specifically, the upper end of each of the hydrogen inlets formed in the main body).

Accordingly, the air outlet guide block 160 may support one side of each of the airtight gaskets (not shown) fitted in a corresponding one of the gasket grooves 111a and 142.

The structure of the parts, to which laser welding is applied, will now be described.

The hydrogen outlet cover 120, the air inlet cover 130, the air outlet cover 140 and the ACV cover 115 are welded to the main body 110 to form a unitary body by means of laser welding. The main body 110 and the components that are welded to the main body 110 (the hydrogen outlet cover 120, the air inlet cover 130, the air outlet cover 140 and the ACV cover 115) are provided with welding protrusions and welding grooves in order to achieve welding using laser welding.

Because the air inlet guide block 150 and the air outlet guide block 160 are formed as separate components, the hydrogen outlet cover 120, the air inlet cover 130 and the air outlet cover 140 are provided along the outer edge portions thereof (specifically, the outer edge portions that are welded to the air inlets 113, the air outlets 114 and the hydrogen outlets 112 in the main body 110) with flange portions 128, 134 and 144 in a closed-loop manner, which are provided with welding grooves (or welding protrusions). In addition, the inner surface of the main body 110 (specifically, the upper ends of the air inlets 113, the air outlets 114 and the hydrogen outlets 112 in the main body 110), on which the flange portions 128, 134 and 144 are disposed, is provided with welding protrusions (or welding grooves).

In an example, as shown in FIG. 4A, the air inlet cover 130 is provided with a flange portion 134, which has therein a welding groove 135 and protrudes from the outer edge portion of the air inflow portion 131, and the upper end of each of the air inlets 113 in the main body 110, on which the flange portion 134 is disposed, is provided with a welding protrusion 113a. In order to facilitate the laser welding between the welding groove 135 and the welding protrusion 113a without interference with the air inflow portion 131, the welding groove 135 and the welding protrusion 113a are formed at the outer portions of the air inlet cover 130 and the main body 110. That is, the flange portion 134, which has therein the welding groove 135, is formed at the outer edge portion of the air inflow portion 131, and the welding protrusion 113a is formed at the outer edge portion of the upper end of each of the air inlets 113.

As shown in FIG. 4b, the air outlet cover 140 is provided with a flange portion 144, which has therein a welding groove 145 and protrudes from the outer edge portion of the air outflow portion 141, and the outer edge portion of the upper end of each of the air outlets 114 in the main body 110, on which the flange portion 144 is disposed, is provided with a welding protrusion 114a.

As shown in FIG. 3A, the hydrogen outlet cover 120 is provided with a flange portion 128, which has therein a welding groove 122 and protrudes from the outer edge portion of the portion (i.e. a hydrogen inflow portion) that is disposed on the upper end of each of the hydrogen outlets 112 in the main body 110, and the upper end of each of the hydrogen outlets 112 in the main body 110, on which the flange portion 128 is disposed, is provided with a welding protrusion 112b.

Therefore, it is possible to assemble the components, which compose the manifold block 100 made of a plastic material, into a unitary body by means of laser welding.

The hydrogen interface 125 for the supply of hydrogen is coupled to the outer surface of the main body 110 so as to communicate with the hydrogen inlets 111 in the main body 110.

The hydrogen interface 125 functions to supply new hydrogen from the hydrogen supply valve of the hydrogen supply device 123 to the hydrogen inlets 111 in the main body 110 and to recirculate hydrogen, from which condensed water has been removed in the condensation chamber 121 of the hydrogen outlet cover 120, to the hydrogen inlets 111 in the main body 110.

Figure 5:
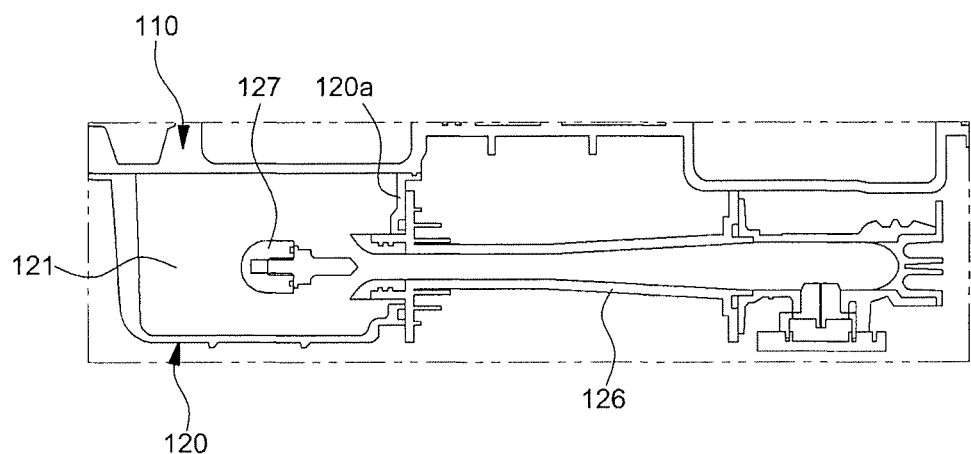
FIG. 5 is a sectional view illustrating a mounting structure of an ejector diffuser according to an embodiment of the present disclosure.

As shown in FIG. 5, the ejector diffuser 126 is assembled between the hydrogen interface 125 and the hydrogen outlet cover 120. One side wall 120a of the hydrogen outlet cover 120, to which and by which one end portion of the ejector diffuser 126 is coupled and supported, is formed in a direction perpendicular to the longitudinal direction of the ejector diffuser 126.

Since the one side wall 120a of the hydrogen outlet cover 120 is formed perpendicular to the longitudinal direction of the ejector diffuser 126, it is possible to improve the hydrogen-tightness between the hydrogen outlet cover 120, the ejector diffuser 126 and the hydrogen interface 125.

As is well known, the ejector diffuser 126 functions to forcibly transfer the hydrogen, which is supplied from the hydrogen supply valve of the hydrogen supply device 123, to the hydrogen interface 125 through an orifice structure of the ejector diffuser.

Since the hydrogen outlet cover 120, the ejector diffuser 126 and the hydrogen interface 125 form a hydrogen flow passage, it is very important to ensure hydrogen-tightness between them.

Figure 7:
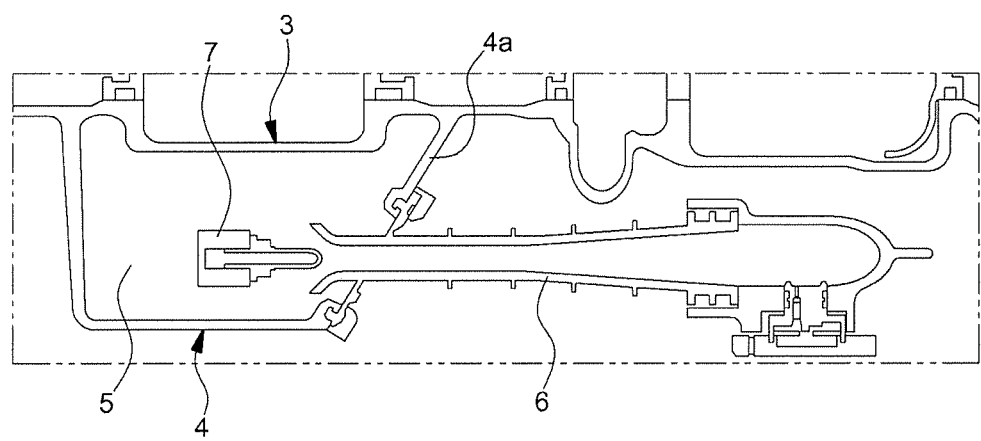
FIG. 7 is a sectional view illustrating a mounting structure of an ejector diffuser of the conventional manifold block.

However, in the conventional manifold block made of an aluminum material shown in FIG. 7, the main body 3, with which a hydrogen outlet cover 4 is integrally formed, is formed such that a matching surface 4a, to which an ejector diffuser 6 is mounted, must be formed at a slant. In order to secure the ejector diffuser 6 to the matching surface 4a, it is necessary for the matching surface 4a to include a gasket groove, an ejector diffuser insertion hole, and an ejector-diffuser-securing tab. In addition, in order to form the matching surface 4a perpendicular to the longitudinal direction of the ejector diffuser 6, tools, for example, drills or taps having a predetermined length (for example, 260 mm or more), must be used. However, the use of such long tools deteriorates mass productivity and causes inaccurate processing due to wobbling of the tools.

Therefore, in the conventional manifold block made of an aluminum material, the matching surface 4a, to which the ejector diffuser 6 is mounted, i.e., the side wall of the hydrogen outlet cover, must be formed in a slanted surface configuration.

However, as a result of the matching surface 4a being slanted, there is a problem in that it is difficult to ensure hydrogen-tightness due to dislocation of a gasket or manufacturing tolerances of components (the main body having a matching surface, the ejector diffuser, etc.). The present applicant has found that a hydrogen leakage problem occurred in numerous low temperature air-tightness tests with respect to the matching surface in the conventional manifold block.

In the manifold block 100 made of a plastic material according to the present disclosure, the hydrogen outlet cover 120 including the condensation chamber 121 is provided separately from the main body 110. Therefore, as shown in FIG. 5, the ejector diffuser 126 and the side wall 120a of the hydrogen outlet cover 120, to which the ejector diffuser 126 is mounted, are disposed perpendicular to each other, thereby improving the hydrogen-tightness of the hydrogen flowing line that is formed by the ejector diffuser 126 and the hydrogen outlet cover 120.

As is apparent from the above description, a manifold block of a fuel cell stack and a method of manufacturing the same according to the present disclosure have the following effects.

First, since the manifold block is made of a plastic material, it is possible to eliminate an additional part for preventing the elution of aluminum ions. Therefore, it is unnecessary to perform an insulation process with respect to passages (air inlets and hydrogen inlets) in the manifold block, which are connected to air passages and hydrogen passages in the stack.

Second, since the manifold block is made of a plastic material, it is possible to prevent a phenomenon in which the temperature of air, which is supplied through a humidifier in a cold-start operation of a stack, drops when the air flows in a manifold block made of an aluminum material, and therefore to improve the cold startability of the fuel cell stack.

Third, since the manifold block is made of a plastic material, it is possible to eliminate post-processing and a coating process, which must be performed after a casting process in a conventional manifold block made of an aluminum material, and therefore to simplify manufacturing processes and to shorten the manufacturing time.

Finally, it is possible to eliminate a passage insulation structure and an airtight gasket, which are needed for a conventional manifold block made of an aluminum material. As a result, manufacturing costs and the weight of the manifold block may be reduced.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A manifold block mounted to a fuel cell stack for supplying and distributing air and hydrogen to the stack, the manifold block comprising:
    a main body including a hydrogen inlet, a hydrogen outlet, an air inlet and an air outlet;
    a hydrogen outlet cover attached to an outer surface of the main body, the hydrogen outlet cover including a condensation chamber connected to the hydrogen outlet;
    an air inlet cover attached to an inner surface of the main body, the air inlet cover including an air inflow portion connected to the air inlet; and
    an air outlet cover attached to the inner surface of the main body, the air outlet cover including an air outflow portion connected to the air outlet;
    wherein the main body includes an air inflow passage sealed by the air inlet cover and an air outflow passage sealed by the air outlet cover,
    wherein the manifold block includes an air cutoff valve (ACV) cover attached to the outer surface of the main body, the ACV cover having holes, and
    wherein the ACV cover is connected to both an inlet of the air inflow passage and an outlet of the air outflow passage.

2. The manifold block of claim 1, wherein the air inlet cover and the air outlet cover are welded to the inner surface of the main body by laser welding, and the ACV cover and the hydrogen outlet cover are welded to the outer surface of the main body by laser welding.

3. The manifold block of claim 1, wherein the air inlet cover and the air outlet cover attached to the inner surface of the main body are disposed along outer edge portions thereof with flange portions which include a welding groove or a welding protrusion for laser welding, and the inner surface of the main body has a remaining one of the welding groove and the welding protrusion for the laser welding.

4. The manifold block of claim 1, wherein the hydrogen outlet cover welded to the outer surface of the main body is disposed along an outer edge portion with a flange portion which include a welding groove or a welding protrusion for laser welding, and the outer surface of the main body has a remaining one of the welding groove and the welding protrusion for the laser welding.

5. The manifold block of claim 1, further comprising:
    an air inlet guide block assembled with the inner surface of the main body, the air inlet guide block surrounding the air inflow portion in the air inlet cover and the hydrogen outlet in the main body to serve as one of walls of a gasket groove formed in an upper end of the air inflow portion and as one of walls of a gasket groove formed in an upper end of the hydrogen outlet.

6. The manifold block of claim 1, further comprising:
    an air outlet guide block assembled with the inner surface of the main body, the air outlet guide block surrounding the air outflow portion in the air outlet cover and the hydrogen inlet in the main body to serve as one of walls of a gasket groove formed in an upper end of the air outflow portion and as one of walls of a gasket groove formed in an upper end of the hydrogen inlet.

7. The manifold block of claim 1, further comprising:
    a hydrogen interface for supply of hydrogen, the hydrogen interface being assembled with the outer surface of the main body to be connected to the hydrogen inlet in the main body.

8. The manifold block of claim 7, further comprising:
    an ejector diffuser assembled between the hydrogen outlet cover and the hydrogen interface,
    wherein one side wall of the hydrogen outlet cover, to which one end portion of the ejector diffuser is coupled, is formed to be perpendicular to a longitudinal direction of the ejector diffuser.

9. The manifold block of claim 1, wherein the main body, the hydrogen outlet cover, the air inlet cover, the air outlet cover and the ACV cover are formed of a plastic material.

10. A method of manufacturing a manifold block that is mounted to a fuel cell stack for supplying and distributing air and hydrogen to the stack, the method comprising:
    forming a main body including a hydrogen inlet, a hydrogen outlet, an air inlet and an air outlet;
    forming a hydrogen outlet cover including a condensation chamber connected to the hydrogen outlet;
    forming an air inlet cover including an air inflow portion connected to the air inlet;
    forming an air outlet cover including an air outflow portion connected to the air outlet; and
    welding the hydrogen outlet cover to an outer surface of the main body and welding the air inlet cover and the air outlet cover to an inner surface of the main body,
    wherein the main body is formed to include an air inflow passage sealed by the air inlet cover and an air outflow passage sealed by the air outlet cover, and
    wherein the method further comprises:
        forming an air cutoff valve (ACV) cover having a hole, wherein the ACV is connected to both an inlet of the air inflow passage and an outlet of the air outflow passage; and
        welding the ACV cover to the outer surface of the main body.

11. The method of claim 10, wherein the air inlet cover, the air outlet cover, the hydrogen outlet cover and the ACV cover are welded to the main body by laser welding.

12. The method of claim 11, further comprising:
    forming a flange portion, including a welding groove or a welding protrusion for laser welding, along an outer edge portion of the hydrogen outlet cover; and
    forming a remaining one of the welding groove and the welding protrusion for the laser welding on the outer surface of the main body.

13. The method of claim 11, further comprising:

forming a flange portion, including a welding groove or a welding protrusion for laser welding, along an outer edge portion of the air inlet cover; and forming a remaining one of the welding groove and the welding protrusion for the laser welding on the inner surface of the main body.

14. The method of claim 11, further comprising:

forming a flange portion, including a welding groove or a welding protrusion for laser welding, along an outer edge portion of the air outlet cover; and forming a remaining one of the welding groove and the welding protrusion for the laser welding on the inner surface of the main body.

15. The method of claim 10, further comprising:

assembling an air inlet guide block with the inner surface of the main body after the welding, wherein the air inlet guide block surrounds the air inflow portion and the hydrogen outlet to serve as one of walls of a gasket groove formed in an upper end of the air inflow portion and as one of walls of a gasket groove formed in an upper end of the hydrogen outlet.

16. The method, of claim 10, further comprising:

assembling an air outlet guide block with the inner surface of the main body after the welding, wherein the air outlet guide block surrounds the air outflow portion and the hydrogen inlet to serve as one of walls of a gasket groove formed in an upper end of the air outflow portion and as one of walls of a gasket groove formed in an upper end of the hydrogen inlet.

17. The method of claim 10, further comprising:

assembling a hydrogen interface for supply of hydrogen with the outer surface of the main body to be connected to the hydrogen inlet in the main body.

18. The method of claim 17, further comprising:

assembling an ejector diffuser between the hydrogen outlet cover and the hydrogen interface, wherein in the forming the hydrogen outlet cover, one side wall of the hydrogen outlet cover, to which one end portion of the ejector diffuser is coupled, is formed to be perpendicular to a longitudinal direction of the ejector diffuser.

\* \* \* \* \*